3,080,479
GAMMA RAY CALIPER
William G. Berg, Crown Point, Ind., and Irwin Ginsburgh, Morton Grove, Ill., assignors to Standard Oil Company, Chicago, Ill., a corporation of Indiana
Filed Nov. 27, 1959, Ser. No. 855,689
1 Claim. (Cl. 250—71.5)

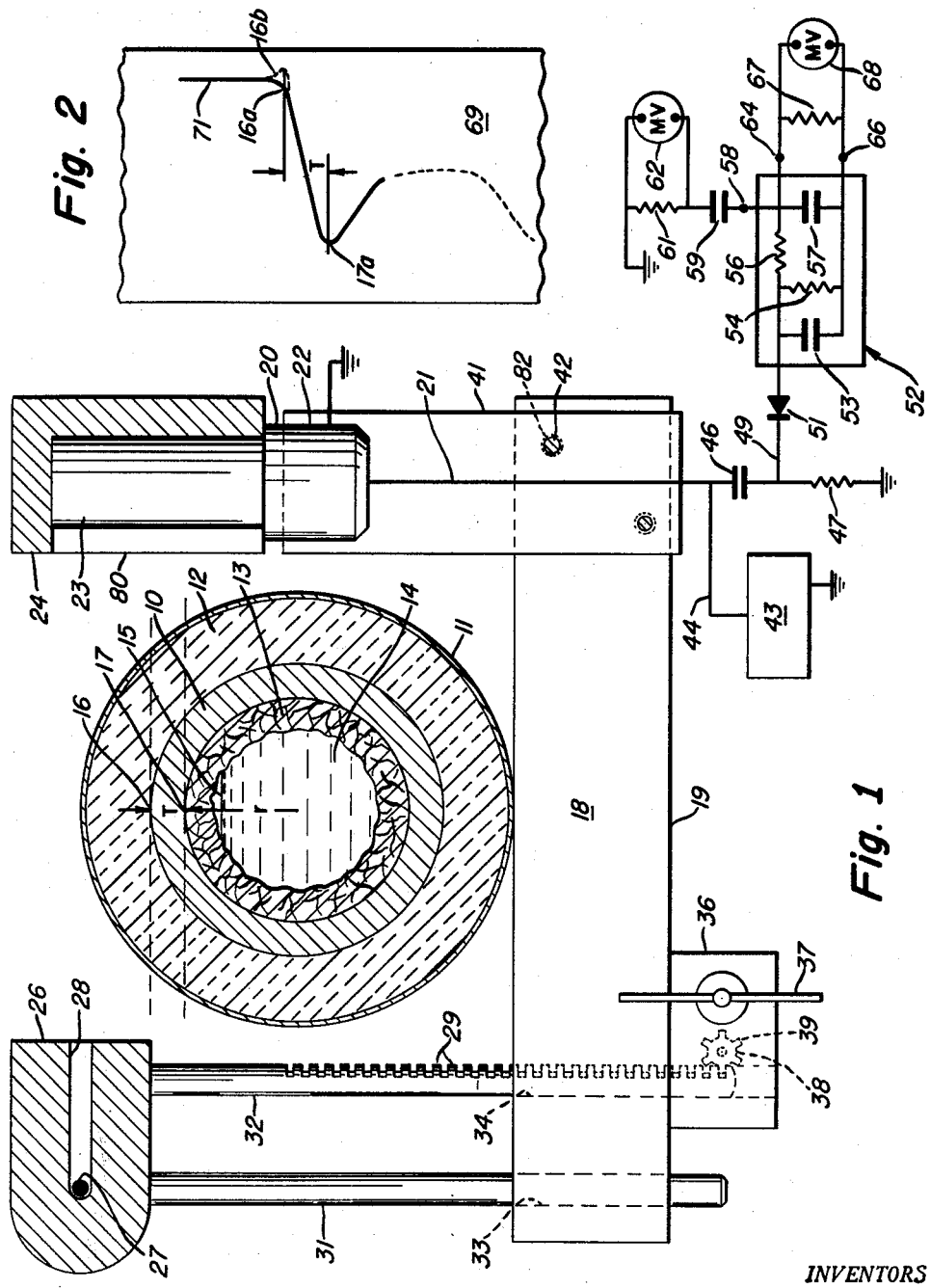
March 5, 1963    W. C. BERG ET AL    3,080,479
GAMMA RAY CALIPER
Filed Nov. 27, 1959
INVENTORS:
William C. Berg
Irwin Gipsburgh
BY
ATTORNEY 3,080,479
Patented Mar. 5, 1963

This invention relates to the measurement of wall thickness of pipes or other tubular members. More particularly, the invention concerns a system capable of making wall thickness measurements of an insulated pipe while such pipe may have fluids and/or solid coatings therein, and which may be at elevated temperatures.

The measurement of wall thickness of pipes or other tubular members while such pipes are empty and in clean condition is readily accomplished by a variety of physical techniques, ranging from simple calipering to complex ultrasonic procedures. However, when pipes are in service, especially when they may contain hot liquids and may be coated internally with coke or corrosion products, thickness measurements take on an entirely different aspect. This problem is complicated when the pipe is externally insulated since removal of even a portion of this insulation represents a major inconvenience, to say nothing of being a costly and time-consuming job.

Of the many methods which have heretofore been suggested for determining wall thickness of cold, clean, and uninsulated pipes, none are capable of making these measurements when the pipes are insulated, on-stream, and may contain unknown deposited linings of coke or other solids. For example, ultrasonic measurements are normally made at pipe temperatures below 200° F. and require pipes that are uninsulated, ground smooth at each point of measurement, oil-coupled, and preferably free of liquids and internal coke deposits. Radiography, employing photographic emulsions and intense radiation sources, is useful at high temperatures but requires many hours for each measurement and may give erratic results with insulated or fluid-filled pipes. Also, personnel can be exposed to high radiation dosages during such work. Other known radiation techniques generally involving the measurement of radiation transmitted through a segment of pipe wall, require careful calibration, and even then are unsuitable with insulated pipes, especially where the pipes contain fluids and/or coke deposits.

A primary object of this invention is to provide a system for determining the wall thickness of pipes or other tubular members while they are on stream at high temperatures, covered with insulation, and containing indefinite amounts of fluids and internal coatings. A further object is to provide a pipe calipering system which is independent of pipe size, pipe cleanliness, or pipe wall composition. Another object is to provide a wall thickness measuring system which is capable of making a measurement within a few minutes that is accurate to within .01" in .25" of pipe wall. Still a further object is to provide a system for measuring wall thicknesses of pipes while they are on stream, thus reducing the necessity for chronologically scheduled shutdowns for routine maintenance. A particular object is to provide a rugged "gamma ray caliper" requiring no calibration and no measurement of the absolute amount of radiation transmitted. A special object is to provide a pipe wall measuring device that requires no preparation of the pipe surface, removal of any insulation, or draining of fluids. Yet a further object is to provide a small, lightweight, measuring device based on radiation principles which is entirely safe with respect to operating personnel. Other and more particular objects will become apparent as the description of the invention proceeds.

Briefly, in accordance with the invention, we employ a well-defined beam of gamma radiation which is moved in such direction to traverse a wall of a pipe or other tubular member. The direction of motion of the beam is preferably radially with respect to the pipe; that is, the beam is moved in a direction perpendicular to any radius. A radiation detector, suitably of the scintillation type, is positioned to receive the beam and an electrical circuit is provided for detecting changes in the level of transmitted radiation which occurs as the beam traverses the pipe wall.

The position of this beam at the commencement of radiation absorption, corresponding to the outer surface of the pipe wall, and the position where radiation absorption is a maximum, corresponding to the interior surface, are both detected. The distance between these positions is equal to the wall thickness. Since the metal composing the pipe wall is substantially more opaque to gamma radiation than either external insulation, internal coke deposits, or most internal fluids, radiation absorption by these latter materials is relatively small in comparison with absorption as a result of interposing pipe metal in the beam. Nonetheless, it is significant. However, this effect is largely eliminated in accordance with the present invention since measurements are not made of radiation level as such, but only of major changes in the radiation level.

According to the preferred embodiment of our invention, the gamma ray beam is collimated to produce a sharp and easily detectable change in the level of transmitted radiation as the beam passes each surface of the wall. A particularly useful embodiment includes the employment of a drive mechanism to move the beam at a constant rate. With this latter feature a measurement is not made of distance or change in position, but rather of time alone. It also enables measurements to be made in exceedingly short times, since movement of the source is continuous and the speed of traverse may be fairly rapid—½" per minute is suitable.

The invention in its various aspects will be described in more detail in the ensuing description read in conjunction with the attached drawing wherein:

FIGURE 1 shows, in simplified schematic form, a preferred embodiment of the invention; and FIGURE 2 shows a typical recorder chart section of a type which is obtainable by means of a recorder connected to the radiation detector circuit of FIGURE 1.

Referring to FIGURE 1, the inventive device takes the form of a yoke 18 which is placed near pipe 10. Arm 41 of yoke 18 is mounted on shank 19 by means of bolts 42 or other fastening means, desirably in a manner which permits adjustability of arm 41 with respect to shank 19 and hence relocation of a radiation detector 20. A second arm carrying radiation source 27 constitutes the other arm of yoke 18 and is mounted on the other side of pipe 10.

As shown in the drawing, pipe 10 is of metal, and may be surrounded by a layer of thermal insulation 12, comprising asbestos or the like, which may be protected against the elements by means of a water-impervious sheath 11 of aluminum, tar paper, etc. Insulation 12 and sheath 11 need not be removed or in any way disturbed to perform the inventive gamma ray calipering. Furthermore, pipe 10 may have a layer of relatively thick solid material 13, such as coke or corrosion scale, coating the inside thereof, while a body of liquid 14, having an indeterminable level 15, may also be present. Although liquid 14 and coating 13 attenuate the radiation somewhat and generate a small error in pipe wall thickness measurement, usually less than 0.01", the instant system is able to largely eliminate major errors arising from insulation, coatings, and certain liquids since determinations are not made of the absolute amount of radiation transmitted, but only changes in the radiation level are detected.

As shown in FIGURE 1 the yoke 18 comprises shank 19, which may be an aluminum bar, arm 41 which is mounted to shank 19 by means of bolt threads through holes 82, and a second arm which carries the nuclear source 27. The first arm 41 carries a radiation detection device which may be of the Geiger type or, for best results, consists of a scintillation meter or scintillometer. The detector 20 shown in the figure is a scintillometer or scintillation meter, including scintillation crystal 23 and a photoelectric detector 22 of the photomultiplier type. To reduce background radiation scintillation crystal 23 is surrounded by a dense gamma ray shield 24 of lead or iron in all directions except the direction facing radiation source 27. A thermal insulation 80 prevents damage to the scintillation crystal by heat from hot pipes.

Radiation source 27 may be any naturally or artifically radioactive isotope emitting gamma rays of sufficient intensity to pass through a pipe wall. Such available materials include cesium 137 (its daughter barium 137 emits a 0.662 mev. gamma photon), or cobalt 60 (emitting a 1.17 and a 1.33 mev. gamma photon per disintegration). Source 27 may be of any suitable form, e.g. pellet, slug, cylinder, or the like; a line source whose axis parallels that of the pipe is preferred. For optimum results with the inventive system, the beam of gamma rays from source 27 is collimated so as to produce relatively sharp changes in the level of transmitted radiation as the beam traverses. Collimation to a 5° spread, or less, is preferred, and it has been found that adequate collimation is obtained by means of a slit 28 which is at least 6″ long, preferably about 8″ long and having a width of about ⅛″ or less. Its depth (the dimension normal to the view shown on FIGURE 1) may be any suitable dimension to accommodate the particular source 27. It will be observed that source 27 is shielded by a dense gamma shield 26 of lead or iron, etc., to effect collimation and to protect surrounding personnel.

Shield 26 is carried by a pair of arms 31 and 32 which are slideably received by shank 19 in bearing poles 33 and 34.

Arm 32 is provided with a plurality of teeth 29 which mesh with corresponding teeth 39 of pinion 38 so as to constitute a rack and pinion gear assembly. Pinion 38 is part of a motor 36 which moves arm 32 and hence source 27 either toward or away from shank 19 at a constant linear rate. As shown in FIGURE 1 motor 36 may be a spring wound motor, powered by winding key 37, or it may be a constant speed electric or pneumatic motor where suitable power is available. Motor 36 moves source 27 in a direction which is perpendicular to the axis of pipe 10, and hence the collimated beam of radiation from source 27 is moved both perpendicular to the axis of pipe 10 and parallel to radius $\gamma$ thereof. Thus as source 27 is moved either to or away from shank 19 its beam traverses the entire wall thickness T, ranging from a position 16 where radiation absorption by pipe wall 10 commences, to position 17 where the pipe wall 10 absorbs the maximum radiation.

Several systems are available for detecting changes in the level of transmitted radiation and for determining position 16 and 17. The simplest is merely to advance source 27 in small increments either by motor 36 or by an alternate manual feed, and observing on a suitable length scale the positions corresponding to minimum and maximum radiation absorption, which of course corresponds to wall thickness. It has been found however that continuous movement of source 27 at a constant rate by means of motor 36 can reduce measurement time to roughly one-fourth of that obtainable with manual adjustment, and accordingly the motor powered embodiment is preferred.

With motor 36 installed and operating, the rate at which source 27 is moved is first determined, in units of length per unit time. Then, time measurements are made of the length of time necessary to move the beam of radiation from position 16 where radiation absorption by pipe 10 commences to position 17 where radiation absorption is at a maximum (or, alternatively, in the opposite direction). By merely multiplying the known rate of movement of source 27 by the measured time interval, a direct determination of pipe wall thickness T is made.

A suitable circuit for use with a scintillation meter 20 is shown in FIGURE 1. A high voltage source 43 powers photomultiplier 22 via lines 44 and 21, and the output of photomultiplier 22 is transmitted via condenser 46 and resistor 47 to line 49. At line 49 a rectifier 21, suitably of the selenium type, conducts the output signal from photomultiplier 22 to a filter circuit 52, consisting of capacitors 53 and 57 and resistors 54 and 56.

Across output terminals 64 and 66 of filter unit 52 a millivoltmeter 68 and a resistor 67 are connected in parallel. With millivoltmeter 68 in this position the reading will be at a maximum so long as there is no attenuation of the radiation level which is sensed by detector 20. Similarly, its reading will decrease as the level of radiation is reduced, reaching a minimum when the radiation beam is at position 17. The length of time from maximum reading (corresponding to position 16) to minimum reading (corresponding to position 17) is taken as a measure of wall thickness T.

Alternatively, a derivative circuit may be connected to filter unit 52. This is shown as capacitor 59 connected to terminal 58, which capacitor is grounded through resistor 61. A millivoltmeter 62 is connected across resistor 61. Using this connection, the reading on millivoltmeter 62 will be essentially zero during the traverse of the radiation beam until the beam intersects position 16 (as the beam is moved radially inward), whereupon it will rapidly increase in value as the derivative of the radiation level changes, again dropping to zero at position 17 when radiation attenuation is at a maximum. The time necessary for the indicator of millivoltmeter 62 to leave zero and then return to zero is taken as the time interval corresponding to thickness T.

In lieu of indicating millivoltmeters 68 or 62, recording millivoltmeters may be employed. These record either the level of radiation or the derivative, depending on whether the recording electrometer is connected at terminals 64—68 or 58, respectively.

FIGURE 2 shows a strip chart record producible by employing a recording electrometer in lieu of millivoltmeter 68. The abscissa on the chart of FIGURE 2 may be in time units or may express the measured time directly in inches of wall thickness T. As shown in FIGURE 2, trace 71 remains virtually unchanged (except for instrument noise and satistical fluctuations) as the beam path traversed insulation 12. Then, as the beam crosses position 16 (on FIGURE 1) the curve breaks rapidly at point 16a; this corresponds to the commencement of radiation absorption by the pipe or other tubular member. Then as the traverse is continued radially, i.e. in a direction normal to radius $r$, the radiation level decreases, ultimately reaching break 17a corresponding to position 17 (FIGURE 1) where the apparent thickness of pipe 10 is at a maximum. The distance between 16a and 17a represents thickness T of the pipe wall. As further shown in FIGURE 2 line 71 would continue at the dotted portion to indicate the amount of radiation attenuation caused by varying thicknesses of pipe metal. By using a very well-defined beam and a source of adequate strength (5 mc.) low energy scattered radiation can enter the crystal just as absorption commences and this can deflect the pen slightly to the right as shown at 16b.

Obviously many modifications may be made in the foregoing apparatus and method. For example, source 27 may be uncollimated where a smaller assembly is desired, and instead a slit may be disposed adjacent the scintillation detector 20, rather than near source 27, and the scintillation detector is thus scanned. A very thin scintillation crystal may be used and the source and detector can both be scanned. The equipment may be made entirely portable by employing battery power supplies. The length of shank 19 and of arm 41 may each be made variable. Instead of traversing the source and the slit, they can both be slowly rotated about the axis of the line source.

For some measurements, as with large diameter thin-walled pipes, the device may be clamped to the pipe being tested, and a chain type of pipe clamp is suitable for this. The device is preferably built in several pieces so that it can be handled as several lightweight parts rather than in one piece. This is especially true of the lead shield 26.

Thus it is apparent that we have fulfilled the objects of our invention and have provided a rugged, accurate, and exceptionally versatile "gamma ray caliper." Our instrument can be employed on hot lines, with insulation surrounding the lines and with coke and liquid in the lines themselves. The source of radiation can be quite small, as little as 5 mc., yet measurements can be made rapidly, without calibration, and without measuring the absolute amount of radiation. Further, the pipe surface need not be prepared in any way whatsoever, and our measurements are independent of pipe diameter, pipe metal composition, and of pipe wall gauge.

While the invention has been described with reference to a particular embodiment thereof, it will be evident that many modifications, variations, and alternatives will be apparent in light of our description. Accordingly, it is intended to embrace all such modifications, variations, and alternatives as fall within the spirit and broad scope of the invention.

We claim:

A metal-pipe calipernig apparatus which is independent of pipe size, pipe cleanliness, and pipe wall composition, and which may be used with insulated pipes and with pipes at elevated temperatures, said apparatus comprising:

a portable yoke member adapted to be attached to said pipe;

a radiation-detecting scintillation crystal and a photomultiplier tube disposed on one arm of said yoke on one side of said pipe;

means for shielding said scintillation crystal from background radiation;

a source of gamma radiation on a second arm of said yoke, said source being movable with respect to said yoke and disposed on the opposite side of said pipe;

means for collimating said gamma radiation as a sharp beam, having less than about 5° spread in the direction of said scintillation crystal, said collimating means being movable with said source;

motor means for moving said source and said collimating means at a constant rate of speed to traverse a wall of said pipe;

a detector system including said scintillation crystal and said photomultiplier tube, said system being responsive to changes in the level of transmitted radiation produced by such traverse;

and clock means for determining the length of time between movement of said source from its position at the commencement of substantial radiation absorption corresponding to the outer wall of said pipe to its position at maximum radiation absorption corresponding to the inner wall of said pipe, the product of such length of time by the rate of source movement being a measure of pipe wall thickness.

References Cited in the file of this patent

UNITED STATES PATENTS

| | | |
|---|---|---|
| 2,748,290 | Reichertz | May 29, 1956 |
| 2,922,887 | Jacobs | Jan. 26, 1960 |